(12) United States Patent
Harr

(10) Patent No.: US 9,650,557 B2
(45) Date of Patent: May 16, 2017

(54) GREEN DIRECTIONAL DRILLING FLUID COMPOSITION

(71) Applicant: Harr Technologies, Inc., Anchorage, AK (US)

(72) Inventor: Robert E. Harr, Kasilof, AK (US)

(73) Assignee: Harr Technologies, Inc., Anchorage, AK (US)

( * ) Notice: Subject to any disclaimer, the term of this patent is extended or adjusted under 35 U.S.C. 154(b) by 281 days.

(21) Appl. No.: 14/055,732

(22) Filed: Oct. 16, 2013

(65) Prior Publication Data

US 2014/0110177 A1    Apr. 24, 2014

Related U.S. Application Data

(63) Continuation of application No. 12/321,377, filed on Jan. 20, 2009.

(51) Int. Cl.
| | | |
|---|---|---|
| *E21B 33/138* | (2006.01) | |
| *E21B 7/04* | (2006.01) | |
| *C09K 8/08* | (2006.01) | |
| *C09K 8/506* | (2006.01) | |
| *C09K 8/516* | (2006.01) | |
| *E21B 7/28* | (2006.01) | |

(52) U.S. Cl.
CPC ............. *C09K 8/08* (2013.01); *C09K 8/506* (2013.01); *C09K 8/516* (2013.01); *E21B 7/04* (2013.01); *E21B 7/28* (2013.01); *E21B 33/138* (2013.01)

(58) Field of Classification Search
CPC .......... C09K 8/08; C09K 8/506; C09K 8/516; E21B 33/138; E21B 7/04; E21B 7/28
See application file for complete search history.

(56) References Cited

U.S. PATENT DOCUMENTS

| | | | |
|---|---|---|---|
| 2,561,075 A | 7/1951 | Sidwell | |
| 2,749,309 A | 6/1956 | Heritage et al. | |
| 2,778,604 A | 1/1957 | Reistle, Jr. | |
| 2,812,161 A | 1/1957 | Mayhew | |
| 2,799,341 A * | 7/1957 | Maly | C09K 8/516 |
| | | | 166/288 |
| 2,805,346 A | 9/1957 | Piety | |
| 3,508,621 A * | 4/1970 | Gaylord | E21B 7/18 |
| | | | 175/67 |
| 3,559,736 A * | 2/1971 | Bombardieri | E21B 43/04 |
| | | | 166/276 |
| 3,568,782 A | 3/1971 | Cox | |
| 3,993,570 A | 11/1976 | Jackson et al. | |
| 4,003,838 A | 1/1977 | Jackson et al. | |
| 4,090,968 A | 5/1978 | Jackson et al. | |
| 4,217,965 A | 8/1980 | Cremeans | |
| 4,519,452 A * | 5/1985 | Tsao | C04B 40/06 |
| | | | 166/288 |

(Continued)

*Primary Examiner* — George Gray
(74) *Attorney, Agent, or Firm* — Dorsey & Whitney LLP

(57) ABSTRACT

A drilling fluid composition for horizontal directional drilling is a flowable aqueous slurry of biodegradable, non-toxic, preferably edible plant particles. The particle size of the plant-derived particles depends on the drill bit used. The particles should be small enough not to clog the fluid jet orifices in normal use. The slurry is pumped through to the drill bit in a warm or preferably hot state, e.g. 80-100° C. After ejection, the slurry cools rapidly, causing solidification and creating a lining on the tunnel wall.

10 Claims, 2 Drawing Sheets

(56) References Cited

U.S. PATENT DOCUMENTS

| | | | |
|---|---|---|---|
| 4,631,136 A | | 12/1986 | Jones, III |
| 5,004,553 A | | 4/1991 | House et al. |
| 5,076,944 A | | 12/1991 | Cowan et al. |
| 5,118,664 A | | 6/1992 | Burts, Jr. |
| 5,332,724 A | | 7/1994 | Burts, Jr. |
| 5,423,379 A | * | 6/1995 | Hale ................. C04B 28/08 166/292 |
| 6,148,935 A | | 11/2000 | Wentworth et al. |
| 6,634,442 B1 | | 10/2003 | Durrieu et al. |
| 6,742,603 B2 | * | 6/2004 | Polizzotti ................. C09K 8/05 175/17 |
| 7,392,844 B2 | | 7/2008 | Berry et al. |
| 8,905,679 B2 | * | 12/2014 | Carter, Jr. ................. B09B 1/00 166/245 |
| 2003/0121701 A1 | * | 7/2003 | Polizzotti ................. C09K 8/05 175/17 |
| 2008/0085841 A1 | | 4/2008 | Brown |
| 2013/0175029 A1 | * | 7/2013 | Carter, Jr. ................. B09B 1/00 166/245 |

\* cited by examiner

GREEN DIRECTIONAL DRILLING FLUID COMPOSITION

TECHNICAL FIELD

This invention relates to drilling fluid of the kind used in commercial directional drilling.

BACKGROUND OF THE INVENTION

Directional boring, often called horizontal directional drilling (HDD), is in common use for installation of pipelines, cables and culverts. Such operations are often undertaken in environmentally sensitive places such as under rivers and near residential areas. The need for biodegradable, low toxicity fluids for use in oil and gas drilling operations has been recognized, as in U.S. Pat. No. 7,392,844. Such drilling fluids are made of organic chemicals: liquids, polymers and the like suited for down hole drilling. Drilling fluids for directional drilling are entirely different and not comparable to those used in down hole drilling. HDD fluid is used to lubricate a drill bit by ejection from orifices in the bit, and in some machines is used to power the drill, i.e. a so called mud motor drill. The mud once ejected from the bit flows into the borehole being formed, usually flowing rearwardly to the open end of the hole. At this location suction is used in an attempt to recover as much of the drilling fluid as possible for re-use.

Since directional drilling fluid is used on or near the earth's surface some degree of release into the environment is unavoidable, and the area over which release can occur can vary greatly. Directional drilling fluid is commonly an aqueous suspension of bentonite (clay) which is non-toxic and inert. However, bentonite based drilling fluids are inorganic and hence not biodegradable, and therefore can have undesirable effects on the environment. For example, after a directional drilling run using conventional drilling fluid, a pool of thick sludge forms at the exit and/or entry site. If not cleaned up or recycled, it solidifies into a hard, clay material.

Other, more difficult to deal with forms of leakage commonly occur. If cracks develop in the side of the drill bore during drilling, then drilling fluid can be pumped up to the ground's surface. Loss of drilling fluid at a location other than the beginning or end of the bore is referred to in the well drilling and horizontal directional drilling arts as "fracking out". In a bore being drilled under a river that is a salmon stream, the bentonite leaks into the river bed and contaminates fish eggs laid there. Although it is non-toxic, it is still capable of harming a fragile ecosystem such as a trout stream. Thus, there is a strong need for a drilling fluid composition that is biodegradable, and also can provide a way of stopping seepage when fracking out occurs. Indeed in very loose soil such as cobble the rate of fluid loss can be so great that recycling of the drilling fluid is not possible. A drilling fluid is needed that can be used in loose soil formations without excessive fluid loss. The present invention addresses these needs with a drilling fluid that is "green" in the sense of benign with respect to its environmental effects.

SUMMARY OF THE INVENTION

A drilling fluid composition according to the invention is a flowable aqueous slurry of non-toxic plant particles. The particles are preferably edible but can be inedible. "Edible" for purposes of the invention means digestible by one or more of humans, animals, birds, aquatic life, or soil organisms such as earthworms. However, the slurry itself may or may not be edible, even though it is non-toxic and biodegradable. Most preferably such particles are derived from grain and grain-like materials such as tapioca, vegetables and fruits. In the context of the present invention, a "grain like" material is a plant-derived one which has properties similar to those of grains when made into an aqueous slurry. Preferred sources of the plant-derived particles include beets, rolled oats, corn meal, cracked wheat, milo seed (sorghum) and tapioca (which is not a grain). The particle size of the plant-derived particles depends on the drill bit used. The particles should be small enough not to clog the fluid jet orifices in normal use. The slurry is pumped through to the drill bit in a warm or preferably hot state, e.g. 80-100° C. After ejection, the slurry cools rapidly, causing solidification as described hereafter.

A method of drilling a bore hole in the ground according to the invention comprises connecting a drill head to a drill string operable by a drilling machine, the drill head having internal passages therein ending in orifices for ejection of drilling fluid. A supply of drilling fluid comprising a slurry of water and particles obtained from edible plants is made up, which particles are sized to fit through the drill head orifices without clogging; The drilling fluid is heated. A hole is drilled through the ground in a substantially horizontal direction by movement of the drill head and drill string in a lengthwise direction of the hole while rotating the drill string in order to rotate the drill head. During the drilling step, the heated drilling fluid is flowed to the drill head passages so that the drilling fluid is ejected from the orifices. Cooling of the drilling fluid in contact with a wall of the borehole forms a layer of solids on the wall of the borehole upon congealing of the drilling fluid.

A drilling fluid composition of the invention usable in horizontal directional drilling, consists essentially of: from 10% to 50% by weight of plant particles having a size to pass through drill head orifices, and the balance is essentially water. These and other aspects of the invention are discussed in the detailed description that follows.

DETAILED DESCRIPTION

Figure 1:
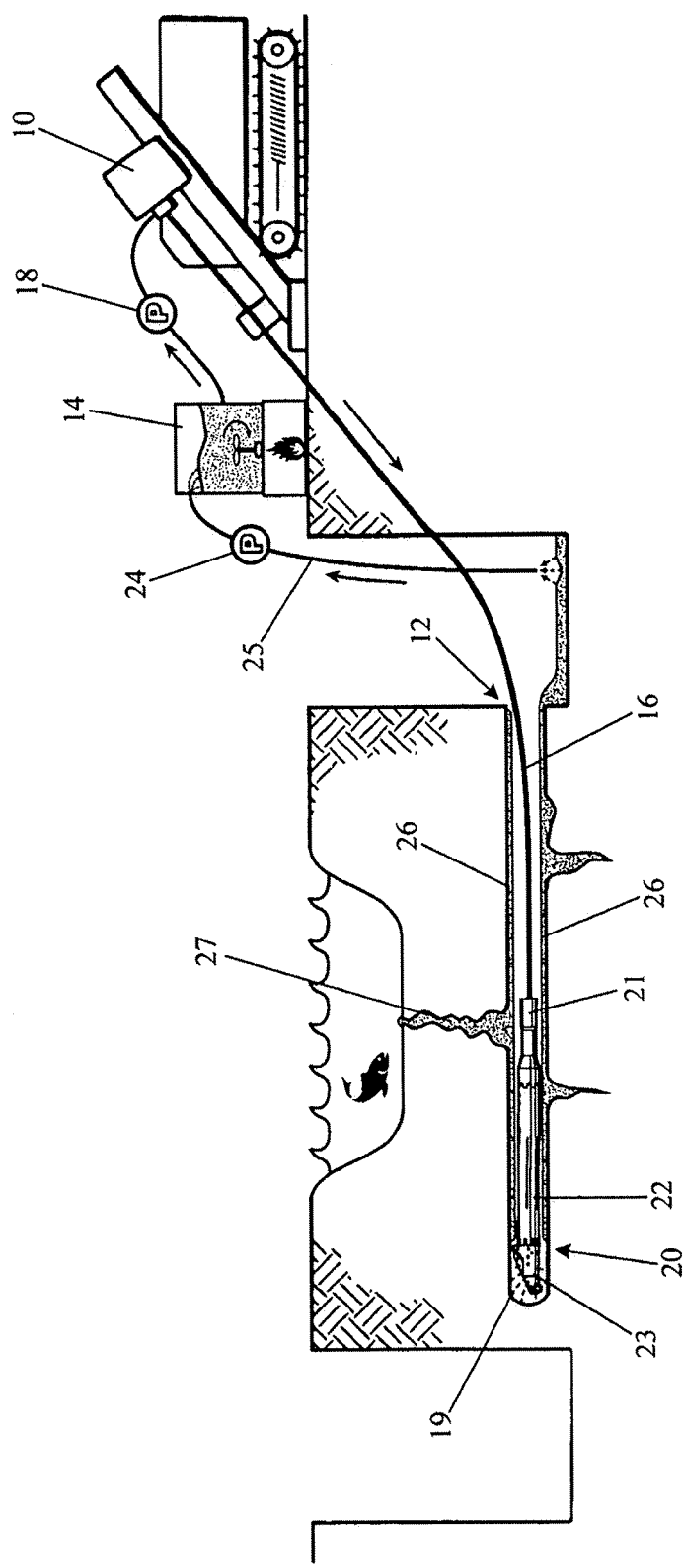
FIG. 1 is a schematic side view of the method of the invention in use while boring out with a drill head.
Figure 2:
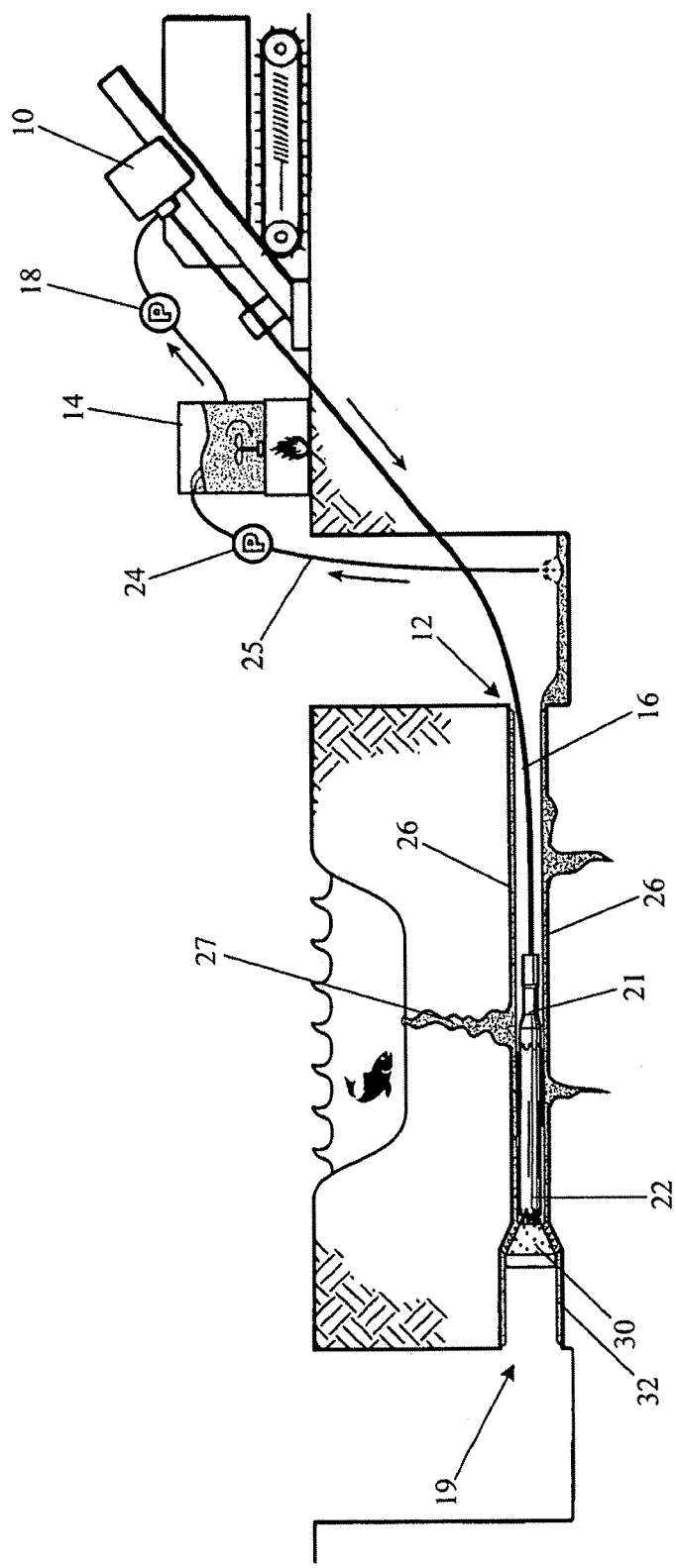
FIG. 2 is a schematic side view of the method of the invention in use while pulling a back reamer back through the bore formed in FIG. 1.

As shown in the drawing, a drilling machine such as an HDD machine 10 is positioned near the entry side of a borehole 12. Drilling fluid according to the invention is made up on site in a tank 14. Tank 14 is connected to the near (proximal) end of a drill string 16 so that hot fluid can be pumped by means of a pump 18 through the drill string 16 to the drill head 20. Drill head 20 typically includes several components connected end to end, namely an adapter 21 that connects to the drill string, a sonde housing 22 that houses a sonde for locating the drill head 20, and a bit 23 that drills the borehole 19. See for example, Wentworth et al., U.S. Pat. No. 6,148,935, the contents of which are incorporated by reference herein. The drilling fluid flows through connecting passages in the adapter 21, sonde housing 22 and bit 23 so that it is ejected from orifices on the bit into the borehole, in a position that lubricates the bit during drilling.

Under good conditions the bulk of the drilling fluid flows back to the entry site and can be recycled using suction supplied by a pump 24 and returned via a line 25 to tank 14. However, if the soil surrounding the borehole 19 is loose or cracked as shown, some of the drilling fluid leaks through the side of the hole and may even reach the ground surface or the bed of a stream under which the borehole passes, as shown. The drilling fluid of the present invention greatly reduces the extent to which this can happen. As it cools in contract with the borehole wall, the drilling fluid congeals and forms a tubular layer 26 on the inside of this hole. If a crack 27 is present, the fluid fills the crack and solidifies, thereby preventing further loss of fluid.

The process continues until the bore s completed, at which the drill string 16 is withdrawn back to the entry side. However, in some cases the first drilling results only in a pilot hole. At the exit site, the drill head 20 is often removed and replaced with a back reamer 30 that is pulled back through the original borehole 19. Back reamer 30 ejects drilling fluid from orifices on its conical outer surface. The layer 26 is ground away but a new layer 32 of larger diameter forms behind the back reamer 30 as the back reamer 30 injects more of the drilling fluid. On the other hand, it may be possible to use water or greatly diluted drilling fluid of the invention made by adding water to what is left in tank 14 at the end of the first (outward) run. If a pipe is pulled into place behind the back reamer in a manner known in the art, and the fluid flow is directed down the pipe, then the new pipeline can be used to prevent leakage and collapse of the hole wall. In such a case it may be preferably to use the drilling fluid on the invention only on the first pass, and use water on the second pass.

As noted the drilling fluid of the invention is preferably hot when it is in tank 14, and in cold climates it may be necessary to connect tank 14 with the feed end of drill string 16 with thermally insulated lines. The exact temperature may vary depending on the thickness of the fluid mixture. Similarly it may prove useful to adjust the thickness of the drilling fluid during drilling based on conditions discovered as drilling proceeds. For example, at first the drill head operates with very little loss of fluid, but then it passes through a wet, boggy spot. Drilling fluid starts leaking at a high rate. Drilling is stopped temporarily, and further solids are added to tank 14 along with additional heating and stirring. The resulting mix may have double or more the solids content of the basic mixture described in the example below. The thicker drilling fluid may then be effective to stop the leaking, or it may be necessary to adjust the composition one or more times. The invention thus permits the drilling operator to adapt to changing soil conditions.

In use, it is best to make up the drilling fluid mixture at the drilling site so that it can be pumped through insulated lines to the drill head. The temperature of the fluid does not need to remain at or above 80° C. during pumping and spraying into the hole. Any temperature that avoids clogging of the jet orifices is sufficient, but the fluid preferably cools when it hits the borehole wall and thus is at least warmer than the ambient temperature inside the hole, which varies depending on the weather conditions.

Example

An aluminum circulation tank is filled with 700 gallons of water. The tank is set up with heating coils heated by a propane burner. The water is heated to a temperature in the range of 80 to 100° C., and then the grain mix is added. About 2 pounds of grain mix per gallon of water is sufficient for a good soil condition, more in poorer soil. ½ pound of beet pulp that passes through a 0.080 or 14 gage mesh screen per gallon of water is used to aid in loss circulation. The grain powder is sized to pass through a 180 to 200 mill screen no larger than 0.032 inch or 21 gage. Recirculation water jets circulate the water the bottom of the tank in a stirring motion. A large rotating mixer beater is set up to stir the center of the tank. The grain powder and beet pulp are slowly added to the water-jetted blender.

The drilling fluid of the present invention is a biodegradable aqueous slurry of particles of plant material. Plant particles that are both edible and non-toxic are strongly preferred. In general the amount of plant particles is at least 2 pounds per gallon of water, or 30% by weight based on 8.33 pounds per gallon of water. However, larger amounts might be needed under difficult conditions. Hence the amount of plant solids (grain and fiber supplying vegetable or fruit together, if both are used), is preferably a range from about 10 to 50 wt. % based on the amount of water. A preferred range is from about 30 to 40 wt. % based on the amount of water. Of the starting solids, in a preferred mix of the invention, 50-75% are grain based particles and the remaining 25-50% are fruit or vegetable based (such as beet pulp) for supplying fiber. If the total amount of plant solids is less than 10 wt %, the suspension is too dilute to effectively form a lining in the borehole. If the amount of plant solids is greater than 50 wt %, the mixture becomes too thick to be sprayable and/or pumpable.

For purposes of sprayability from the drill bit, particle size for the plant derived particles is important in preventing clogging, but the design of the bit and its orifice and passage sizes may require fine particles or permit more coarse particles than those described here. In a preferred form of the invention useable with commercial HDD bits such as the Trihawk® series, the grain particles are screened prior to use so that the average particle size is not greater than about 0.05 inch, preferably no greater that 0.032 inch (i.e. a 0.032 inch maximum particle dimension.) The second plant material used to supply fiber is usually more coarse than the first plant material which is usually grain based. The second plant particles may be twice the size Of the first particles, for example up to 0.1 inch, preferably from 0.06 to 0.08 inch.

When drilling with a high flow system, a larger sieve material, 0.283 inch particles (1 gage) may be used due to the size of the drill jet hole openings that will allow the larger loss circulation material to flow and seal the cracks or anomaly more rapidly. Beet pulp, alfalfa pellets, saw dust, cracked corn kernels, wheat hulls and rice are effective for this purpose. Likewise milo berries or any grain product that will pass through a 1 gage sieve can be used. Thus a general upper limit for the particle size can be as large as 0.3 inch, even through much smaller particles limited to 0.05 inch or less will have wider applicability. Duckbill and bear claw bits used in normal soils can be provided with larger fluid ejection ports than highly machined bits capable of drilling through rocky soils.

As the primary plant particles, grains and grain-like materials such as tapioca are preferred. Such a composition, when fracking out occurs in a river, packs into the crack, rapidly sealing it. Milo seed for example will pack into the cracks under the ground and swells with in the presence of moisture and heat and/or pressure to shut off the flow of the drilling fluid to the river bottom. The mixture also causes the drill hole to seal the wall, allowing the drill fluid that is still in the borehole to return to the drill and help prevent further lost circulation.

In the example above, beets are used in a small amount to add fiber to the mixture. The fibrous strands found in fruit and vegetable pulp provide improved sealing of haps in the borehole wall. The amount of plant fiber particles is generally less than that of the grain-based particles, typically half as much or less.

Not all plant materials are suitable for use in the present invention. The plant based material must have a particle size and properties such that it does not plug the directional drill fluid ejection nozzles, but does plug the fractures in the ground. Cotton seeds, newspaper shreds and crushed pecan shells will not go down and out of the directional drill nozzles to plug the fractures in the ground. The plant material used in the invention deposits and preferably sets up when deposited on the wall of a bore, forming a tubular wall or lining, and also sets up when it fills cracks in surrounding soil.

The present invention is especially effective in wet or loose soils wherein fracking out is so extensive that is becomes difficult to return any of the drilling fluid back to the drill for re-use. Aqueous slurries made from a crushed corn based mixture with beet pulp fill the voids in the ground and seal the hole, enabling drilling fluid return back to the drill. In a test run beneath a river using the corn based mixture, no fracking out occurred in the river and just in a small spot leaked out in the swamp. Corn was seen bubbling to the surface but the void was the size of a softball. This mix makes a wall cake (lining) that gives more structure than drilling mud.

A thick grain mix of the invention has the further advantage of holding the cobble rock back better than conventional drilling mud. In other words, the invention is useful in loose formations like cobble in preventing collapsing of the drilled bore. The amount of the plant solids in such as case could be as high as 50 wt. % or somewhat more.

The crushed corn, cracked wheat, beet pulp, or rabbit pellets (e.g. commercial rabbit food) break down enough when heated to go through the drill stem and out of the nozzles. When the grains go into the cold ground, the grains swell and cool into a thick paste to support the hole. The paste and cracked grains (in the case of cracked wheat) fill the voids. For the fracture plugging function it is necessary for the grains to swell under these conditions. Use of gum or starch compounds in a liquid without grains is possible but the results are no different than those using the conventional mud mixes. Thus the mixture of the invention is in the from of a particle slurry or suspension, not a solution. A slurry containing pieces (particles) of whole grain are very effective for plugging and swelling as described above. Oatmeal works well. After heating and exposure to water (as in cooking), it sets and turns to a very thick solid, good for holding a bore hole open in cobble.

As the foregoing suggests, the choice of plant derived material can vary depending on the soil conditions, the ecology of the area, and cost considerations. For example, to the extent that the drilling fluid once solidified is exposed or at or close to the ground's surface, the attractiveness of the material as food to local animals may be a concern, and to avoid the nuisance of pests, the plant particles can be selected to be inedible or at least unpalatable to local wildlife. Flavors disliked by local animals may be added to the mixture.

Drilling fluids of the invention are especially good for holding the borehole open in sand, cobble, and glacial till soils. The "green" fluids of the present invention will pass through the small jet holes of the drill heads. Wildlife protection authorities will appreciate the benefits of using the material to seal the river bottom, and if the material comes out it should do no harm. It does not create a flume of silt to cover up the aquatic life or the fish eggs from spawning fish. Potentially the material, to the extent it reaches the river bottom, is an additional food source for desirable wildlife there.

Beet pulp has a fibrous strand that will help to gather solids of the fluid together in a soil anomaly. The beet pulp strands intertwine, congregate, and form a mass to seal the soil crack or anomaly. Additionally, such fibers add mass strength to hold the hole open and allow return fluids to continue on the driller's directed path of the drill head. Small amounts of additives can be used, for example preservatives, flavorants and vegetable oil and other agents to improve the flowability of the slurry especially at higher solids levels. Agents that tend to promote coagulation on sudden cooling can prove useful in specific formulations. Grain products used in the invention contain a substantial amount of protein, preferably room 10-20 wt. % of the total grain content. For the reasons mentioned above, it is preferred according to the invention to use a fibrous plant extract, beets being the example above, in an amount of up to 50% of the amount of grain product used.

It will be understood that the foregoing description is of preferred exemplary embodiments of the invention, and that the invention is not limited to the specific forms described and illustrated. For example, plants considered mildly toxic in their natural state may prove useful for the slurry solids, and it foes almost without saying that combinations of manner different plant-derived particles can be used. These and other modifications may be made in without departing from the spirit of the invention.

The invention claimed is:

1. A method of drilling a bore hole in the ground, comprising:
   connecting a drill head to a drill string operable by a drilling machine, the drill head having internal passages therein ending in orifices for ejection of drilling fluid;
   making a supply of drilling fluid comprising a slurry of water and particles obtained from edible plants, which particles are sized to fit through the drill head orifices without clogging, wherein the drilling fluid comprises from 10% to 50% by weight of plant particles having a size to pass through drill head orifices, and the balance being essentially water, and wherein the plant particles include first particles of one more grains and second, fibrous particles or one or more fruits or vegetables, wherein the amount of second particles is limited to about half as much by weight of the first particles;
   heating the drilling fluid;
   drilling a hole through the ground in a substantially horizontal direction by movement of the drill head and drill string in a lengthwise direction of the hole while rotating the drill string in order to rotate the drill head;
   during the drilling step, flowing the heated drilling fluid to the drill head passages so that the drilling fluid is ejected from the orifices; and
   upon cooling of the drilling fluid in contact with a wall of the borehole, forming a layer of solids on the wall of the borehole upon congealing of the drilling fluid.

2. The method of claim 1, wherein the drill head comprises a drill bit that rotates and moves forwardly as the drill strong advances away from the drilling machine.

3. The method of claim 1, wherein the drill head comprises a back reamer that rotates and moves rearwardly as the drill strong retreats towards the drilling machine.

4. The method of claim 1, further comprising adjusting the amount of particles obtained from edible plants to thicken the slurry in response to fracking out of drilling fluid.

5. The method of claim 1, wherein the heating step heats the slurry to a temperature in the range from 80 to 100° C.

6. The method of claim 1, further comprising pumping heated drilling fluid from a supply of drilling fluid through passages conducting the drilling fluid to the internal passages of the drill head, such that the drilling fluid is ejected from the drill head into the hole and cools upon ejection.

7. The method of claim 1, wherein the drill head is a bit, wherein the drilling step comprises rotating the bit at one end of a drill string while flowing the drill fluid through the drill string to the internal passages in the bit, and ejecting the fluid from orifices in the bit during drilling.

8. The method of claim 1, wherein the plant particles do not exceed 0.3 inch in size.

9. The method of claim 1, wherein the plant particles do not exceed 0.05 inch in size.

10. The method of claim 1, wherein heating the drilling fluid includes heating and stirring the drilling fluid at a temperature in the range of 80 to 100° C.

* * * * *